United States Patent
Lelcuk et al.

(10) Patent No.: US 11,979,407 B2
(45) Date of Patent: *May 7, 2024

(54) METHOD AND SYSTEM FOR BLOCKCHAIN-BASED ANTI-BOT PROTECTION

(71) Applicant: Radware Ltd., Tel Aviv (IL)

(72) Inventors: Alon Lelcuk, Ramot Meir (IL); David Aviv, Tel Aviv (IL)

(73) Assignee: RADWARE, LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,318

(22) Filed: May 10, 2023

(65) Prior Publication Data

US 2023/0283609 A1    Sep. 7, 2023

Related U.S. Application Data

(63) Continuation of application No. 16/983,328, filed on Aug. 3, 2020, now Pat. No. 11,677,753, which is a
(Continued)

(51) Int. Cl.
*H04L 9/40* (2022.01)
*G06F 21/36* (2013.01)
(Continued)

(52) U.S. Cl.
CPC ......... *H04L 63/10* (2013.01); *G06Q 20/3823* (2013.01); *H04L 9/0637* (2013.01);
(Continued)

(58) Field of Classification Search
CPC ..... H04L 63/10; H04L 9/0637; H04L 9/3213; H04L 63/1441; H04L 63/20; H04L 9/50;
(Continued)

(56) References Cited

U.S. PATENT DOCUMENTS 7,721,107 B2  5/2010  Golle et al.
8,671,058 B1  3/2014  Isaacs
(Continued)

FOREIGN PATENT DOCUMENTS

CN   107079036 A   8/2017
CN   107563846 A   1/2018
(Continued)

OTHER PUBLICATIONS

Alexopoulos et al., "Towards Blockchain-Based Collaborative Intrusion Detection Systems", Telecooperation Group, Oct. 2017, p. 1-13.
(Continued)

*Primary Examiner* — Darren B Schwartz
(74) *Attorney, Agent, or Firm* — M&B IP Analysts, LLC

(57) ABSTRACT

A method for protecting entities against bots is provided. The method includes identifying a request from a client to access a protected entity; selecting an access policy in response to the access request, wherein the access policy includes at least one challenge to be performed by the client; identifying results of the at least one challenge, wherein the results are provided by the client upon completion of the challenge; determining a bias of the client based on the completion results, wherein the determined bias is utilized for a cyber-security assessment of the client; and granting access to the protected entity by the client based on the determined bias.

21 Claims, 3 Drawing Sheets

Related U.S. Application Data continuation of application No. 16/182,011, filed on Nov. 6, 2018, now Pat. No. 10,742,658.

(60) Provisional application No. 62/663,132, filed on Apr. 26, 2018.

(51) Int. Cl.
| | |
|---|---|
| *G06F 21/64* | (2013.01) |
| *G06Q 20/02* | (2012.01) |
| *G06Q 20/04* | (2012.01) |
| *G06Q 20/06* | (2012.01) |
| *G06Q 20/38* | (2012.01) |
| *H04L 9/00* | (2022.01) |
| *H04L 9/06* | (2006.01) |
| *H04L 9/32* | (2006.01) |

(52) U.S. Cl.
CPC ........ *H04L 9/3213* (2013.01); *H04L 63/1441* (2013.01); *H04L 63/20* (2013.01); *H04L 9/50* (2022.05); *H04L 2463/144* (2013.01)

(58) Field of Classification Search
CPC ............. H04L 2463/144; H04L 9/3271; H04L 63/101; H04L 63/0807; H04L 63/102; H04L 63/1458; H04L 2209/56; H04L 9/3239; H04L 63/12; G06Q 20/3823; G06Q 20/02; G06Q 20/0457; G06Q 20/065; G06Q 20/0655; G06Q 20/381; G06Q 2220/00; G06F 21/36; G06F 21/64
See application file for complete search history.

(56) References Cited

U.S. PATENT DOCUMENTS

| | | | |
|---|---|---|---|
| 8,752,157 B2 | 6/2014 | Radhakrishnan | |
| 9,424,414 B1 | 8/2016 | Demirjian et al. | |
| 9,426,182 B1 | 8/2016 | Zeljko et al. | |
| 9,452,355 B1 | 9/2016 | Lin | |
| 9,514,293 B1 | 12/2016 | Moritz et al. | |
| 9,705,895 B1 | 7/2017 | Gutzmann | |
| 9,723,005 B1 | 8/2017 | McInerny et al. | |
| 9,807,092 B1 | 10/2017 | Gutzmann | |
| 10,049,202 B1 | 8/2018 | Johansson et al. | |
| 10,097,583 B1 | 10/2018 | Demirjian et al. | |
| 10,268,817 B1 | 4/2019 | Pham et al. | |
| 10,282,557 B1 | 5/2019 | Pore et al. | |
| 10,587,596 B1 | 3/2020 | Sahar et al. | |
| 11,195,177 B1* | 12/2021 | Vijayvergia | ......... G06Q 20/401 |
| 2006/0156385 A1 | 7/2006 | Chiviendacz et al. | |
| 2007/0150934 A1 | 6/2007 | Fiszman et al. | |
| 2010/0017890 A1 | 1/2010 | Tucker et al. | |
| 2010/0037147 A1 | 2/2010 | Champion et al. | |
| 2010/0037319 A1 | 2/2010 | Steeves et al. | |
| 2010/0162357 A1 | 6/2010 | Chickering et al. | |
| 2010/0222142 A1 | 9/2010 | Mori | |
| 2010/0318669 A1 | 12/2010 | Chugh | |
| 2011/0113147 A1 | 5/2011 | Poluri et al. | |
| 2011/0231913 A1 | 9/2011 | Feng et al. | |
| 2012/0023554 A1 | 1/2012 | Murgia et al. | |
| 2012/0144501 A1 | 6/2012 | Vangpat et al. | |
| 2013/0179958 A1 | 7/2013 | Fujiwara et al. | |
| 2013/0347067 A1 | 12/2013 | Li et al. | |
| 2014/0325223 A1 | 10/2014 | Turgeman et al. | |
| 2014/0325645 A1 | 10/2014 | Turgeman et al. | |
| 2015/0128236 A1 | 5/2015 | Moscicki et al. | |
| 2015/0222604 A1 | 8/2015 | Ylonen | |
| 2015/0317463 A1 | 11/2015 | Herunde et al. | |
| 2015/0356555 A1 | 12/2015 | Pennanen | |
| 2015/0363769 A1 | 12/2015 | Ronca et al. | |
| 2016/0012424 A1 | 1/2016 | Simon et al. | |
| 2016/0048662 A1 | 2/2016 | Arnoud et al. | |
| 2016/0162897 A1 | 6/2016 | Feeney | |
| 2016/0188850 A1 | 6/2016 | Limbasia et al. | |
| 2016/0224803 A1 | 8/2016 | Frank et al. | |
| 2016/0292592 A1 | 10/2016 | Patthak et al. | |
| 2016/0328545 A1 | 11/2016 | Chan et al. | |
| 2016/0330235 A1 | 11/2016 | Thompson | |
| 2016/0359904 A1 | 12/2016 | Ezra et al. | |
| 2017/0031802 A1 | 2/2017 | Sowerby et al. | |
| 2017/0048234 A1 | 2/2017 | Lohe et al. | |
| 2017/0070534 A1 | 3/2017 | Bailey et al. | |
| 2017/0149560 A1 | 5/2017 | Shah | |
| 2017/0221052 A1 | 8/2017 | Sheng et al. | |
| 2017/0237570 A1 | 8/2017 | Vandervort | |
| 2017/0243208 A1 | 8/2017 | Kurian et al. | |
| 2017/0244707 A1 | 8/2017 | Johnsrud et al. | |
| 2017/0244709 A1 | 8/2017 | Jhingran et al. | |
| 2017/0293912 A1 | 10/2017 | Furche et al. | |
| 2017/0323392 A1 | 11/2017 | Kasper et al. | |
| 2017/0331802 A1 | 11/2017 | Keshava et al. | |
| 2017/0366564 A1 | 12/2017 | Ping et al. | |
| 2017/0366566 A1 | 12/2017 | Demirjian et al. | |
| 2018/0041336 A1 | 2/2018 | Keshava et al. | |
| 2018/0060496 A1 | 3/2018 | Bulleit et al. | |
| 2018/0068130 A1 | 3/2018 | Chan et al. | |
| 2018/0096175 A1 | 4/2018 | Schmeling et al. | |
| 2018/0159881 A1 | 6/2018 | Crabtree et al. | |
| 2018/0197172 A1 | 7/2018 | Coburn et al. | |
| 2018/0225466 A1 | 8/2018 | Ducatel et al. | |
| 2018/0225469 A1 | 8/2018 | Daniel et al. | |
| 2018/0280802 A1 | 10/2018 | Stroud | |
| 2018/0332063 A1 | 11/2018 | Ford | |
| 2019/0073666 A1 | 3/2019 | Ortiz et al. | |
| 2019/0172026 A1 | 6/2019 | Vessenes et al. | |
| 2019/0184286 A1 | 6/2019 | Du et al. | |
| 2019/0205512 A1 | 7/2019 | Franco | |
| 2019/0220592 A1 | 7/2019 | Liu et al. | |
| 2019/0299105 A1 | 10/2019 | Knight et al. | |
| 2019/0305968 A1 | 10/2019 | Versteeg et al. | |
| 2019/0306235 A1 | 10/2019 | Veale et al. | |
| 2019/0334717 A1 | 10/2019 | Lelcuk et al. | |
| 2019/0370793 A1 | 12/2019 | Zhu et al. | |
| 2019/0370813 A1 | 12/2019 | Bravick et al. | |
| 2020/0027089 A1 | 1/2020 | Kuchar et al. | |
| 2020/0028853 A1 | 1/2020 | Ford et al. | |
| 2020/0366671 A1 | 11/2020 | Larson et al. | |
| 2021/0243188 A1 | 8/2021 | Grocutt | |
| 2022/0272084 A1 | 8/2022 | Hyatt | |
| 2023/0091851 A1 | 3/2023 | Tamir et al. | |

FOREIGN PATENT DOCUMENTS

| | | |
|---|---|---|
| DE | 102017117598 A1 | 2/2019 |
| KR | 101837169 B1 | 3/2018 |
| KR | 101837170 B1 | 4/2018 |
| WO | 2017021154 A1 | 2/2017 |
| WO | 2017136956 A1 | 8/2017 |

OTHER PUBLICATIONS

Boyd, et al., "Fair Client Puzzles from the Bitcoin Blockchain," Norwegian University of Science and Technology, Norway, 2016, pp. 161-177.

Ho, et al., "Statistical Analysis of False Positives and False Negatives From Real Traffic with Intrusion Detection/Prevention Systems," IEEE Communications Magazine, vol. 50, No. 3, Mar. 2012, pp. 146-154.

International Search Report and Written Opinion of International Searching Authority for PCT/US2019/027476, ISA/RU, Moscow, Russia, dated Aug. 8, 2019.

International Search Report and Written Opinion of International Searching Authority for PCT/US2019/028029, ISA/RU, Moscow, Russia, dated Aug. 26, 2019.

International Search Report and Written Opinion of International Searching Authority for PCT/US2019/028031, ISA/RU, Moscow, Russia, dated Aug. 8, 2019.

Kang, et al., "Online Game Bot Detection Based on Party-Play Log Analysis", Computers and Mathematics with Applications, the Netherlands, vol. 65, 2013, pp. 1384-1395.

(56) References Cited

OTHER PUBLICATIONS

Ouaddah, et al., "FairAccess: a New Blockchain-based Access Control Framework for the Internet of Things: FairAccess: a New Access Control Framework for IoT," Security and Communication Networks, vol. 9, No. 18, Dec. 2016, pp. 5943-5964.
The European Search Report for European Patent Application No. 19730655.8, dated Sep. 29, 2020, EPO, Munich, Germany.
The European Search Report for European Patent Application No. 19730656.6 dated Dec. 8, 2020, EPO, Munich, Germany.
The European Search Report for European Patent Application No. 19730657.4 dated Dec. 10, 2020, EPO, Munich, Germany.
The European Search Report for European Patent Application No. 19730658.2 dated Sep. 30, 2020, EPO, Munich, Germany.
The First Foreign Office Action for European Patent Application No. 19730655.8 dated Jan. 13, 2022, EPO, Munich, Germany.
The First Foreign Office Action for European Patent Application No. 19730658.2 dated Jan. 13, 2022, EPO, Munich, Germany.
The International Search Report and the Written Opinion for PCT/US2019/028030, ISA/RU, Moscow, Russia, dated Jul. 23, 2019.
Yin, et. all. Botnet Detection Based on Correlation of Malicious Behaviors, 2013.
First Office Action for app # CN 201980041504.9, dated Mar. 7, 2024. The State Intellectual Property Office of People's Republic of China, Bejing, China.
First Office Action for App No. CN 201980042983.6, dated Mar. 12, 2024. The State Intellectual Property Office of People's Republic of China.

* cited by examiner

METHOD AND SYSTEM FOR BLOCKCHAIN-BASED ANTI-BOT PROTECTION

CROSS REFERENCE TO RELATED APPLICATIONS

This application claims the benefit of U.S. patent application Ser. No. 16/983,328 filed Aug. 3, 2020 which in turn claims the benefit of U.S. patent application Ser. No. 16/182,011 filed Nov. 6, 2018, now U.S. Pat. No. 10,742,658 issued on Aug. 11, 2020. The application Ser. No. 16/182,011 application claims priority from U.S. Provisional Application No. 62/663,132 filed on Apr. 26, 2018. The contents of all of the foregoing are hereby incorporated by reference.

TECHNICAL FIELD

This disclosure generally relates to network security technology, and more particularly to detection, classification, and mitigation of Internet bots.

BACKGROUND

A bot is a software application that is configured to execute automated tasks, often over large networks such as the Internet. Bots can be used to perform helpful functions but are often employed for more nefarious purposes. Botnets are collections of coordinated bots that run over one or more systems and can be programmed to execute harmful codes. Because botnets are often implemented using infected home computers or Internet of Things (IoT) devices with random IP addresses, or virtual machines which can regularly change certain identifying characteristics such as MAC address or Internet Protocol (IP) addresses, it can be difficult to identify, track and block attacks initiated by such botnets. Botnets can share an attacked system with legitimate users such that their presence is effectively hidden.

Advanced botnets utilize machine learning techniques to better coordinate the attack. Such machine learning techniques are used to alleviate the Command and Control (C&C) burden, optimize the attack, and circumnavigate counter measures. One common technique used is based on Swarm intelligence allowing for self-organization of botnets.

The Open Web Application Security Project (OWASP) foundation has classified automated threats (Bots) against Web applications into 6 categories: Account Credentials, Availability of Inventory, Abuse of Functionality (other), Payment Cardholder Data, Vulnerability Identification, and Denial of Service (DoS). The nature and operation of threats in each such category is different and should be handled differently. For example, in the "Availability of Inventory" category, threats related to Denial of Inventory, Scalping, and Sniping are executed. On the other hand, threats in the "Vulnerability Identification" category include vulnerability scanning, footprinting, and fingerprinting. As such, different detection and mitigation techniques should be utilized for different types of detected threats.

Existing anti-bot solutions use a simple "human or machine" test to establish trust and security context, i.e., a human is trusted but not machines. Current solutions utilize interactive challenges to verify if a transaction is initiated by a legitimate client application (e.g., a web browser) and is under control of a human. Examples for such challenges are a SYN cookie, a web redirect (e.g., 302 HTTP redirect message), a JavaScript challenge, a CAPTCHA, and the like used individually or orchestrated to a single flow.

Establishing security context and trust based on web challenges suffers from several limitations. For example, such challenges require an interactive session with a client device. Further, for at least a CAPTCHA challenge, a graphical user interface (GUI) is also required. As such, the challenges negatively affect the user experience while accessing the web services. In addition, challenges that require a GUI cannot operate to allow machine-to-machine authentication, such as through Application Programming Interfaces (APIs). This is a major disadvantage since many of today's legitimate clients, such as IoT devices, are not equipped with suitable GUIs. Further, CAPTCHAs can be bypassed using "sweatshops."

Further, in the related art, existing anti-bot solutions rely on tracking user activities and devices using "fingerprinting" techniques to monitor and identify bot activity. A fingerprint of a computing device is information collected about the device (e.g., a smartphone) for identification. Fingerprints can be used to fully or partially identify individual users or devices even when cookies are turned off. Tracking user activity includes collecting behavioral data over time.

Generating a unique fingerprint for a large number of devices requires the fingerprints to be very sensitive to variations in the collected data, as such fingerprints become less stable over time and, as a result, a device may not exhibit the same fingerprint over time. This adversely affects the value of the collected data. Fingerprinting techniques are also susceptibility to spoofing. A bot may actively modify its fingerprint to alter its historical date or to identify its data as that of another device. Further, anti-bot solutions impose componential penalties when validating fingerprints.

Furthermore, existing anti-bot solutions attempt to cross-correlate the data with device or personal information such as, for example, a user name, a phone number, login credentials, and so on. As such, existing anti-bot solutions breach privacy of users, and thus may not be effective due to privacy regulations. For example, general data protection regulation (GDPR) prohibits sharing devices' fingerprints across sites.

Currently there is no available cyber-security solution that provides both effective detection while maintaining the privacy of the users. Therefore, with malicious bot activity accounting for about a third of all Internet traffic, it would be advantageous to provide an efficient solution that would cure the deficiencies of existing anti-bot solutions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for protecting entities against bots. The method includes identifying a request from a client to access a protected entity; selecting an access policy in response to the access request, wherein the access policy includes at least one challenge to be performed by the client; identifying results of the at least one challenge, wherein the results are provided by the client upon completion of the challenge; determining a bias of the client based on the completion results, wherein the determined bias is utilized for a cyber-security assessment of the client; and granting access to the protected entity by the client based on the determined bias.

Certain embodiments disclosed herein include a trust broker system for anti-bot protection. The system includes a processing circuitry; and a memory, the memory containing instructions that, when executed by the processing circuitry, configure the system to: identify a request from a client to access a protected entity; select an access policy in response to the access request, wherein the access policy includes at least one challenge to be performed by the client; identify results of the at least one challenge, wherein the results are provided by the client upon completion of the challenge; determine a bias of the client based on the completion results, wherein the determined bias is utilized for a cyber-security assessment of the client; and grant access to the protected entity by the client based on the determined bias.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
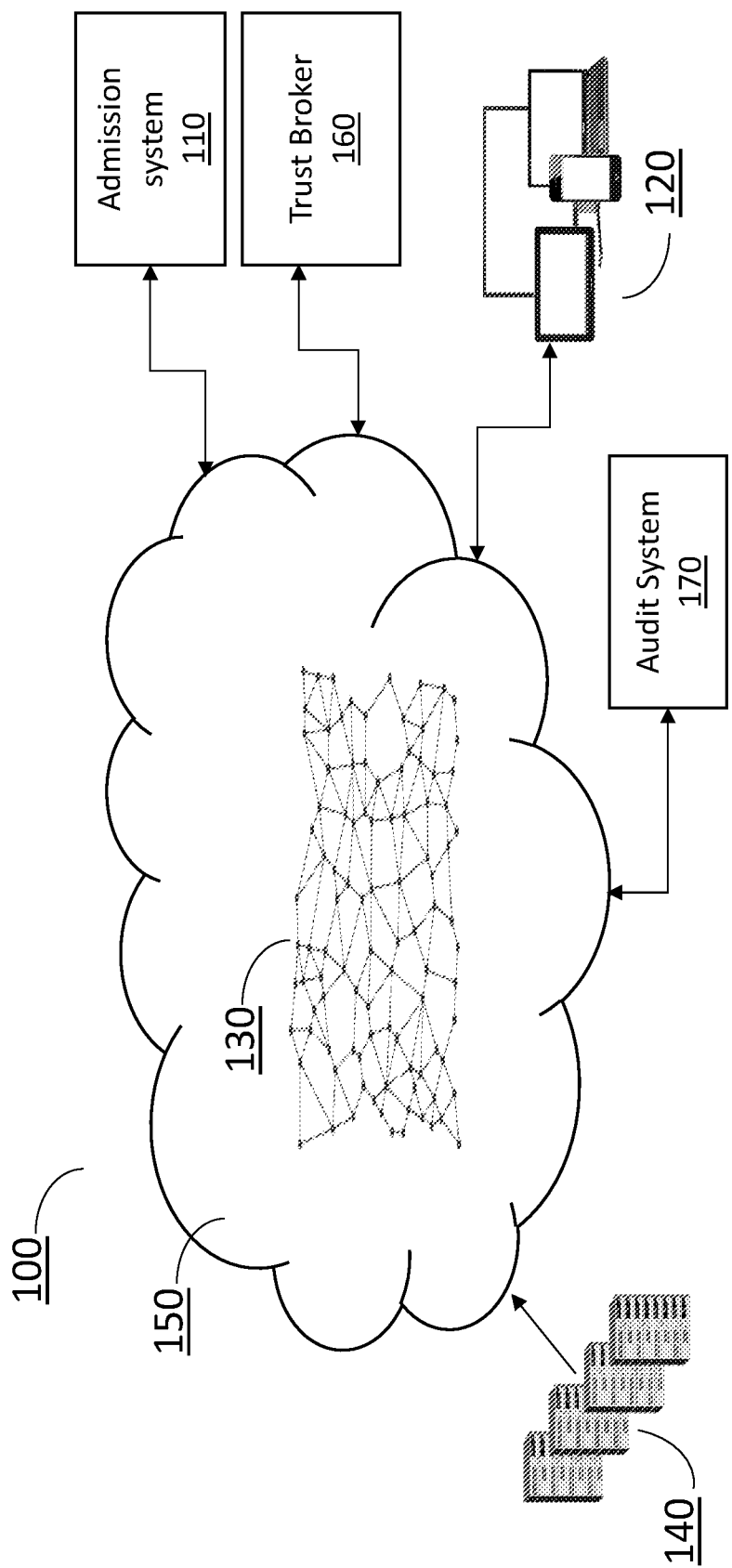
FIG. 1 is a network diagram utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, a method and system for blockchain-based anti-bot protection are provided. In an example embodiment, a game is used to control access to protected entities. Specifically, a game is a mechanism by which the bias is established and henceforth access rights and privileges are gained, exchanged, or otherwise used. The game, when executed, can also reveal the behavior of the client (or its user). A bias may be defined as metadata utilized for cyber-security assessments. Different types of biases are defined herein. Such types include, but are not limited to, a cognitive bias, a behavior bias, and an intent bias. The various types of biases are determined using different types of games executed by a client attempting to access a protected entity.

The game's type, scope and available strategies are set in an access policy defined for the protected entity. A bias is determined based on the results of the game. Based on the bias, a determination can be made if a client accessing a protected entity is, for example, a bot. That is, drift or deviation from the expected or previously established bias would be indicative of a bot.

FIG. 1 shows an example network diagram 100 utilized to describe the various disclosed embodiments. The network diagram 100 illustrated in FIG. 1 includes an admission system 110, a client 120, a blockchain peer-to-peer network 130 (hereinafter referred to as the blockchain network 130, merely for simplicity purposes), a protected entity 140, a trust broker 160, and an audit system 170. The entities in the network diagram 100 communicate via a network 150, reside in the network 150, or both.

The client 120 may be a PC, a mobile phone, a smart phone, a tablet computer, a server, and the like. The client 120 may be operated by a legitimate user or a legitimate program, or may be an attack tool. The client 120 may execute an application or program to access the protected entity 140.

The protected entity 140 is the entity to be protected from malicious threats. The protected entity 140 may be any network or computing element including resources that can be accessed by the client 120. For example, the protected entity 140 may be a function in a serverless architecture, an application server, a web server, a cloud application, a datacenter, a network device (e.g., a router, an ADC, etc.), a firewall (e.g., a web-application firewall), and so on.

In certain implementations, the audit system 170 is utilized to record or log any transactions performed between two or more of the admission system 110, the client 120, the trust broker 160, and the protected entity 140. For example, the audit system 170 is configured to record any suspicious user or bot activity (e.g., many access attempts by a client, a high rate for utilizing access tokens, and so on). In another embodiment, the function of logging transactions by the audit system 170 is performed on the blockchain network 130, i.e., using a distributed ledger maintained thereon.

According to an embodiment, the trust broker 160 may be connected with the protected entity 140, where both the trust broker 160 and the protected entity 140 are peers in the blockchain network 130 and each may act as a proxy to the network 150. For example, acting as a proxy may include translating from HTTPS messages to messages that can be transported on the network 150. Each of the trust broker 160 and the protected entity 140 may be configured to receive or otherwise intercept requests (such as, but not limited to, HTTP/HTTPS requests) generated by the client 120.

In an embodiment, the trust broker 160 is configured to administer the games that a client 120 needs to participate in to gain access to the protected entity 140 or to specific resources (not shown) within the protected entity 140. In an embodiment, the trust broker 160 is configured with a plurality of access policies. An access policy defines at least: the protected entities and resources under protection, one or more games used in the protection template, a game scope for each game, initialization parameters of each game, completion criteria for each game, and the steps to perform upon completion of a successful game or game completion awards.

A game scope is the group of cooperating protected entities or resources within the protected entity 140 and the visibility and validity of access tokens within the group. The game scope may be private in which case there is an active instance of a game per a protected entity resource. An entity game is a single game instance shared by multiple protected resources within the protected entity 140. A global game is a single game instance shared by all protected resources across multiple protected entities within a Trust Broker. The various games and their respective strategies are discussed in greater detail below.

It should be noted that, although one client 120, one admission server 110, and one protected entity 140 are illustrated in FIG. 1 merely for the sake of simplicity, the embodiments disclosed herein can be applied to a plurality of clients, a plurality of admission servers, a plurality of protected entities, or any combination of thereof. Further, a plurality of admission systems and trust brokers can be utilized or be configured in a distributed implementation. The clients may be in different geographical locations. Furthermore, a single client 120 may be served by a plurality of admission servers 110 or trust brokers 160 concurrently.

It should be further noted that, in certain embodiments, the admission system 110 and the trust broker 160 may be implemented in a single system or as a distributed system. Further, each element discussed above can also be integrated in a single system, for example: the admission system 110 and the protected entity 140 may be implemented as a single unified gateway. In an embodiment, the audit system 170 is integrated in the admission system 110.

In another embodiment, the admission system 110, the trust broker 160, the protected entity 140, or a combination thereof, can be implemented in a network device (not shown) already deployed in the network 150. Examples for such a network device include an application delivery controller (ADC), a load balancer, a web application firewall (WAF), a router, a firewall, and the like.

The blockchain network 130 is a collection of one or more nodes (not labeled) utilized to maintain a decentralized ledger and verified blocks, as discussed above. A node may be a physical machine, or a virtual machine executed by a machine having a sufficient computing power to verify a block. In an embodiment, the nodes of the blockchain network 130 may be configured to handle proprietary access tokens (e.g., verified block of transactions for converting proprietary tokens). The proprietary access tokens may be of different types.

In another embodiment, the nodes of the blockchain network 130 may be configured to handle tokens of standard virtual currencies such as, but not limited to, Bitcoin, Ethereum, Litecoin, and the like. For example, the infrastructure to the Ethereum blockchain network is based on a collection of nodes realized as Ethereum Virtual Machines (EVM) connected in a mesh connection. Each such node runs a copy of the entire blockchain and competes to mine the next block or validate a transaction. Further, each node in the blockchain network 130, implemented as Ethereum, maintains an updated copy of the entire Ethereum blockchain. In an embodiment, the blockchain network 130 can be configured as a private network. In this embodiment, access tokens (or contracts) accessible to nodes that are connected to the blockchain network 130 operate in a private mode. In yet another embodiment, a private token is utilized as part of a public or private Ethereum blockchain.

In another embodiment, the trust broker 160 may be implemented as a smart contract using the crypto EVM capabilities. A smart contract is a computer protocol intended to digitally facilitate, verify, or enforce the negotiation or performance of a contract and is defined as a collection of executable computer code in one of many possible computer languages such as, but not limited to, "Python", "Java", "R", "Solidity" or any other computer languages used now or in the future to implement such smart contracts. Smart contracts allow the performance of credible transactions without the existence of trusted third parties. These transactions are trackable and irreversible.

It should be appreciated that, in some embodiments, utilizing the blockchain network 130 for the admission process allows maintaining privacy of the user accessing the protected entity 140 while providing transparency of admission transactions. Further, the blockchain network 130 can be easily scaled, therefore providing a scalable solution.

According to the disclosed embodiments, any client, e.g., the client 120, attempting to access the protected entity 140 is required to execute a game as defined by an access policy provided by the trust broker 160 for the protected entity 140 or one of its resources being accessed. The game and the game scope is defined in an access policy selected by the trust broker 160.

According to the disclosed embodiments, the game may be realized as executable code executed by the trust broker 160. In another embodiment, the game can be realized as parametric data loaded dynamically by the trust broker 160. In yet another embodiment, a rule engine or other programmatic mechanism is utilized to enforce game progression according to established game rules.

A game may be executed in the trust broker 160 or can be executed by the client 120, wherein the capabilities of the blockchain network 130 are used to secure the interaction between the client 120 and the trust broker 160.

Each game is designed to allow the trust broker 160 to establish a bias for the client 120. The bias is established as the client 120 progresses with the game, at the completion of the game, or both. In an embodiment, a game is used to establish a behavior bias using risks represented as access tokens. The tokens may be proprietary tokens or based on standard virtual currencies (e.g., Bitcoins) or contracts. Further, the access tokens can be of the same type or different type. In an embodiment, the trust broker 160 is further configured, based on the knowledge of the client historical game behavior and game rules, to set a dynamic conversion value from a first type of token to a second type of token.

In one embodiment, a cognitive bias may be established based on accumulation of access tokens. To this end, when the game executed would present the user with options to pick-up access tokens while solving riddles, navigating through a maze, and the like.

As a non-limiting example for a game for establishing a cognitive bias, a maze with treasures is used. The maze is generated based on a complexity level defined in the respective access policy. For example, for a highly secure protected entity, a complex maze would be generated. The maze can be realized as portable executable code or parametric data loaded dynamically by the client 120 to the rules engine. A user of the client 120 is requested to navigate the maze to collect objects. The collection of objects results in awarding the user with access tokens, that is the objects represent access tokens. As another non-limiting example, the game may include a series of questions for which answers to the questions reveal cognitive bias inclinations.

The game progression is monitored to determine how the client (or its user) interacts with the game. This allows for determining the cognitive bias. The progress may be measured with respect to, but not limited to, time of activities, choices made by the user, and the like. For example, the time it was required to collect the objects, the number of collected objects, type of collected objects (candies or bugs), and so on. The cognitive bias is associated with the client 120 and saved in the blockchain network 130 as an encrypted block. Thus, no entity but the trust broker 160 has knowledge of the determined bias.

In another embodiment, a behavioral bias may be established based on access tokens spending. To this end, the executed game would present the client 120 (or its user) with options to spend access tokens and, based on the actual tokens spent, the behavioral bias is determined.

As a non-limiting example for a game for establishing a behavioral bias, the game may be a bidding game where the user is requested to place a bid on, for example, accessing a protected entity, purchasing access tokens, and the like. The higher the bid is, the behavioral bias is determined to be of a spender.

In yet another embodiment, an intent bias may be established based on a balance of the access tokens. The intent bias also defines the intent of a client navigating through a protected entity. For example, if the protected entity is an e-commerce web-site, the intent may indicate if the user is scarping for information, comparing prices, or shopping. In an embodiment, the games can be hiding in links of products in such an e-commerce website. For example, the games may include crafting interactions that have intent hidden in the game for selection (e.g., "are you looking for similar products" versus "are you looking for a cheap present for a friend").

Other embodiments to establish the intent bias may include presenting the client 120 with multiple games and requesting the client to select one game. Based on the game selection, the intent is established. As another example embodiment, by building a hiding decision tree in a game, each decision branch allocates/deallocate the client 120 with a certain number of tokens. Further, by tracking the selected branches, the trust broker 160 can infer the intent bias.

The trust broker 160 is configured to allow or deny access to the protected entity 140 based on the bias or any deviation thereof. The trust broker 160 may further provide a recommendation as whether to allow admission or not. It should be emphasized that the admission is not granted merely based on the fact that the user successfully completed the game, but rather based on the determined bias. For example, the maze game may be successfully completed when the user collected a number of objects, but the cognitive bias is determined based on the type of collected objects (e.g., candies vs. bugs). Thus, if even all objects have been collected, still admission may not be granted. Any failed admission may be logged in the audit system 170.

It should be noted that all transactions related to the game to be performed, awarding access tokens, and saving the established biases are performed over the blockchain network 130.

Specifically, the granting of the access tokens is recorded as a transaction included in a block of a blockchain maintained by the blockchain network 130. Upon requesting an access to the protected entity 140 by the client 120, the client 120 "pays" the protected entity 140 the required number of access tokens.

This may be performed by revoking (spending) access tokens granted to the client 120 to gain access. In other words, the use of the access tokens is recorded as a transaction and included in a block of the blockchain maintained by the blockchain network 130. Thus, the validation of the transaction (access request) is performed through the blockchain network 130. The validation can be performed prior to admitting an access to the protected entity 140. In yet another embodiment, the validation is performed after an admission is conditionally granted to the client. If the validation fails, the client 120 is disconnected from the protected entity 140.

The policies, games, and biases can be utilized to detect various types of attacks. Such attacks include an account takeover, a denial of inventory, a denial of service, and anti-scraping.

An as example, the access policy may periodically administer a similar cognitive bias game to the client 120 by monitoring cognitive bias drifts. If such a bias drift is identified, the protected entity 140 may conclude that the client 120 has undergone an account take over attack.

As another example, the access policy can cross reference the client's 120 intent with the client's 120 behavior. When the protected entity 140 identifies that the client's 120 behavior is similar, yet the intent has changed, may be determined that the client 120 has now changed its role and a cognitive bias game may be administered to further validate the user authenticity.

As another example, the intent bias may signify the user's role in the system and deviation from that intent bias is indicative of an attack. For instance, the intent bias of a user may be determined to be only about reading transactions. If that bias intent is modified into writing transactions, this may signify an access violation.

It should be noted that the changes in the intent bias may not be deterministic. For example, many embodiments can utilize a numerical dimension for an intent bias. For example, the user may have 20/80 write/read intent bias. By monitoring the change of ratios between intent biases, potential security risks may be determined based on changes in ratio and thus the protected entity 140 may change its access restriction.

In yet another embodiment, the client 120 and the protected entity 140 may optionally include means for maintaining tokens issued by the admission system 110 and the trust broker 160 or can utilize the cryptocurrency wallet described herein.

Further, each established bias for a client 120 is recorded as a transaction included in a block of a blockchain maintained by the blockchain network 130. The transaction can be signed by the keys of the client 120 and trust broker 160.

In another embodiment, the blockchain network 130 can maintain an entire game instance or a URL to the game location. After retrieving and playing the game, the client 120 deposits the game completion results or criteria as metadata in a blockchain transaction.

Figure 2:
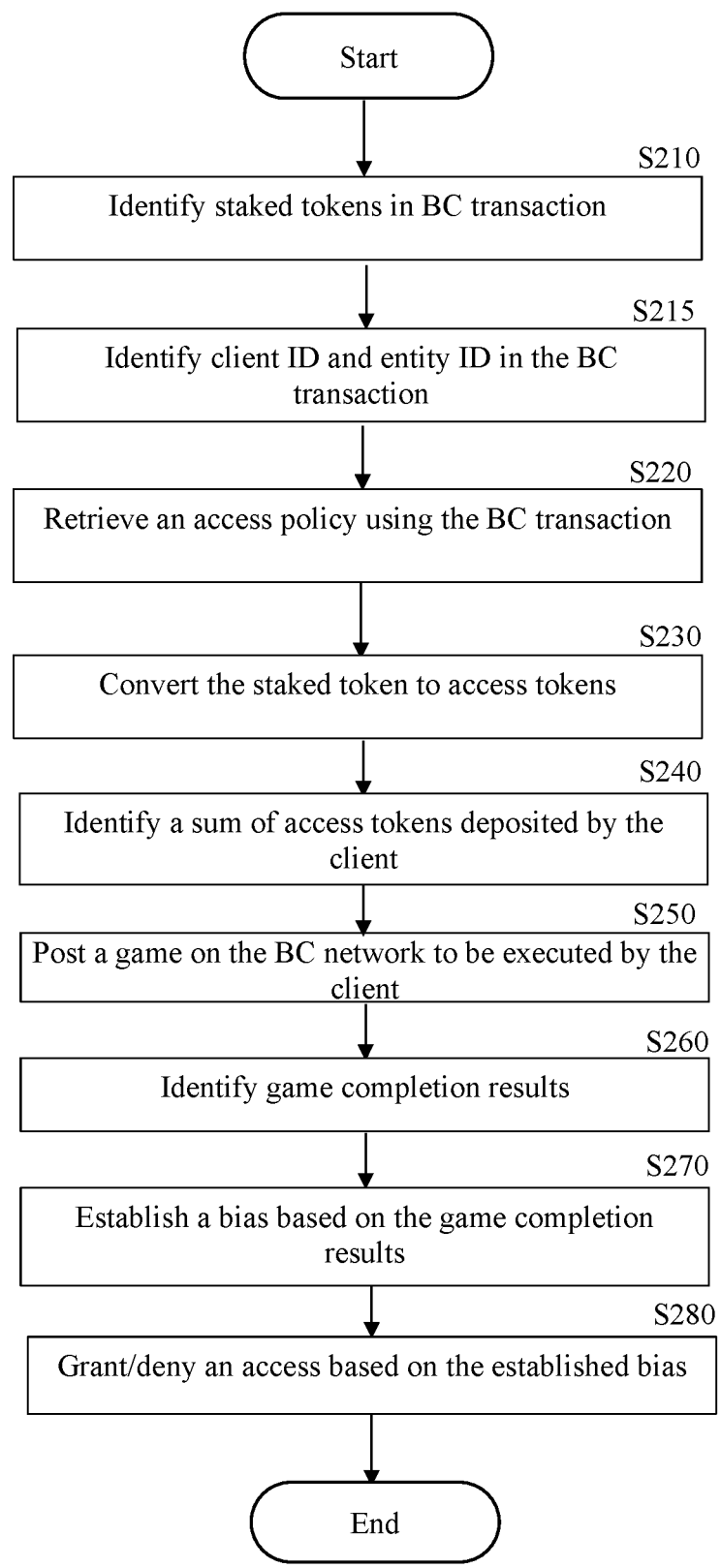
FIG. 2 is a flowchart illustrating a method for anti-bot protection mechanism according to an embodiment.

FIG. 2 shows an example flowchart 200 for establishing bias and trust for clients attempting to access a protected entity according to an embodiment. The method may be performed by the trust broker 160 using the blockchain network 130.

At S210, the blockchain network is monitored to identify a client 120 may stake (i.e., place a bet) a number of previously awarded access tokens. The staked access tokens are provided as a payment transaction in the blockchain network 130. The staked access tokens can be associated with a request to access a protected entity. The access request includes an identifier (e.g., an IP address, a URL, and the like) of the protected entity (or resource) to access.

At S215, the blockchain transaction is analyzed to identify the protected entity ("entity ID") addressed by the client form the transaction metadata. That is, an entity ID is extracted from the transaction. S215 also include identifying an identifier of the client ("client ID"). The client ID can be supplied by the protected entity 140 or by an admission system 110. In other embodiments, the client 120 may generate its own ID. To this end, the client ID can be randomly selected or derived based on the client's system parameters, such as, but not limited to, an IP address, a MAC address, and the like. The client ID may be mathematically derived using proof of knowledge to track client activity across multiple protected entities. In yet another embodiment, the client ID may be a USER-ID as provided by an external authentication service such as those using OAuth or SAML systems and used as admission controller 110.

It should be noted that the client ID does not reveal any information about the user of the client 120. Further, the generation of the client ID on the client 120 does not require exposing or sharing personal information related to the user device, or even the identifying details on the device or user. The client 120 merely shares a proof about the client ID.

At S220, using the entity ID, the respective access policy assigned to the protected entity attempted is retrieved.

An access policy defines a game type and a scope of the game. A scope of a game may be a private game, an entity game, or a global game. For each game instance, the game specific parameters are defined. The game parameters may include, for example, a conversion value, a number of starter tokens to participate in the game, an expiration time, terms on the usability of the access tokens, and so on.

The access policy further designates a protected entity (or resources of the protected entity) and corresponding games the client has to execute in order to access the designated protected entity or resources. As noted above, a protected entity resource can be assigned multiple games, each game may be assigned with its own priority (e.g., optional, required, required and sufficient, and so on). The access policy may define replenishment method.

In an embodiment, a number of access policies may be associated with a single protected entity. In such an embodiment, the selection of the access policy is based on the protected entity designated in the received access request. Further, the selection may be based on a plurality of selection parameters. Such parameters may be related to the client 120, the protected entity 140, or a combination thereof.

In an embodiment, the selection of the policy is based on information retrieved from external sources. Examples for such sources include, for example, external databases, reputation services, and historical records. The historical records may include, for example, successful or failed access attempts, previously selected games, and so on. The historical records are retrieved from the audit system 170. As an example, for a client with a "bad" reputation, an access policy with multiple games will be selected.

At S230, the staked access tokens are converted into a first type of access tokens, thereby allowing the client 120 to execute a game. The conversion value may be dynamically determined based on the access policy, historical records (e.g., about past gaming behavior of the client), or both. The first type of tokens are deposited on the blockchain network 130. It should be noted that, if the client 120 does not hold enough staked access tokens, no conversion is made and execution terminates.

At S240, the blockchain network 130 is monitored to determine if the client 120 deposited enough of the first type of access tokens to participate in a game. The first type of access tokens may be proprietary tokens, cryptocurrency tokens, and the like. The type and sum of tokens require to participate in a game are specified in the access policy. In an embodiment, the client 120 is required to deposit (pay) the designated sum of access tokens at every instance of the game.

Upon identification of such tokens, at S250, the game to be executed by the client 120 is posted as a transaction on the blockchain network 130. As noted above, the game instance can be embedded wholly in the blockchain network 130 or, in another embodiment, the blockchain network 130 may hold a URL to the game location.

The game and its complexity to be executed by the client 120 are defined in the respective policy. As noted above, different games can be utilized to determine a different bias, such as an intent, cognitive, or behavior bias.

At S260, the blockchain network 130 is monitored to identify the game completion results deposited by the client 120. The results may be deposited as metadata in a blockchain transaction.

At S270, based on the identified completion results, the respective bias for the executed game is established. As demonstrated above, the cognitive bias is characterized by access tokens accumulation, the intent bias is characterized by access tokens balance, and the behavior bias is characterized by access tokens spending. Examples for establishing a bias using the executed games are provided above.

At S280, based on the established bias, an access to the protected entity is granted or denied. That is, the admission is not granted merely based on the fact the client 120 (or its user) successfully completed the game, but rather based on the determined bias. For example, if the behavior bias is established as a spender, admission may not be granted. This is because as bot behavior would attempt to access the protected entity many times, thus would require more token spending.

It should be noted that the method discussed herein with reference to FIG. 1 merely for the sake of simplicity and ease of the description. The disclosed embodiments are not limited to the arrangement shown in FIG. 1.

Figure 3:
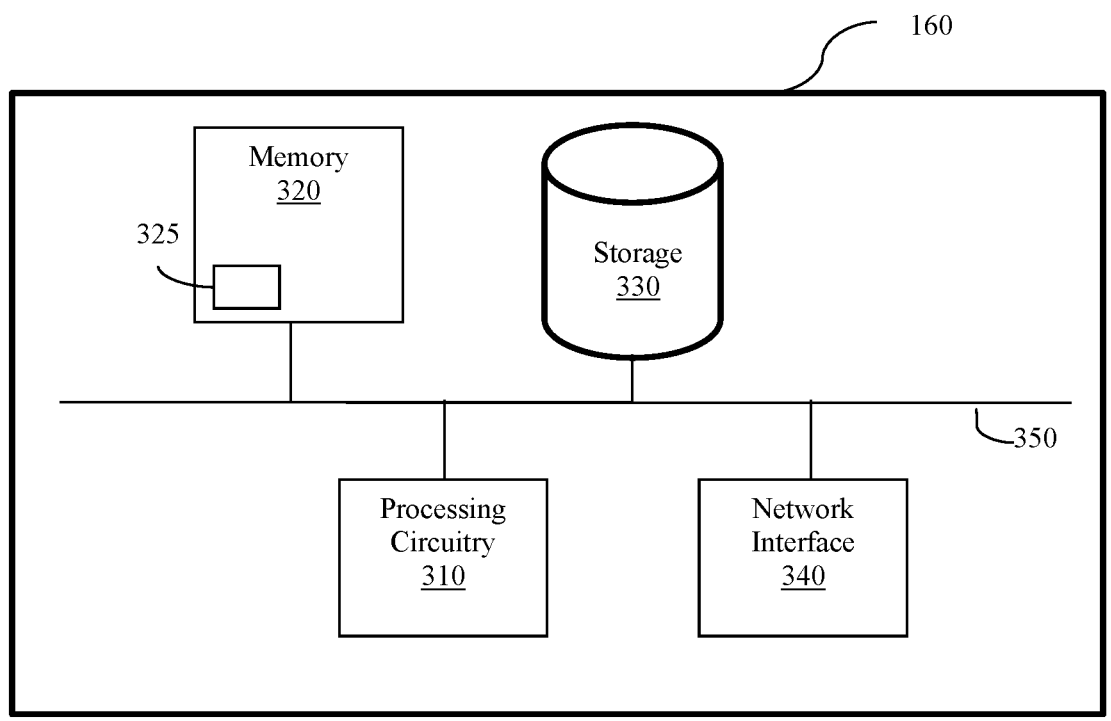
FIG. 3 is an example block diagram of the trust broker system according to an embodiment.

FIG. 3 is an example block diagram of the trust broker 160 according to an embodiment. The trust broker 160 includes a processing circuitry 310 coupled to a memory 320, a storage 330, and a network interface 340. In an embodiment, the components of the trust broker 160 may be communicatively connected via a bus 350.

The processing circuitry 310 may be realized as one or more hardware logic components and circuits. For example, and without limitation, illustrative types of hardware logic components that can be used include: field programmable gate arrays (FPGAs), application-specific integrated circuits (ASICs), application-specific standard products (ASSPs), GPUs, system-on-a-chip systems (SOCs), general-purpose microprocessors, microcontrollers, digital signal processors (DSPs), and the like, or any other hardware logic components that can perform calculations or other manipulations of information. In an embodiment, the processing circuitry 310 (or the entire system 110) may be implemented as a Turing machine over the blockchain network.

The memory 320 may be volatile (e.g., RAM, etc.), non-volatile (e.g., ROM, flash memory, etc.), or a combination thereof. In one configuration, computer readable instructions to implement one or more embodiments disclosed herein may be stored in the storage 330.

In another embodiment, the memory 320 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 310 to perform blockchain-based admission, as discussed hereinabove. In a further embodiment, the memory 320 may further include a memory portion 325 including the instructions.

The storage 330 may be magnetic storage, optical storage, and the like, and may be realized, for example, as flash memory or other memory technology, CD-ROM, Digital Versatile Disks (DVDs), hard-drives, SSD, or any other medium which can be used to store the desired information, such as, log of transactions, public keys, and so on. The storage 330 may include the various access policies and games.

The network interface 340 allows the trust broker 160 to communicate with the blockchain network, clients, trust broker, and protected entities. The network interface 340 furthers peer-to-peer communication with these elements.

It should be understood that the embodiments described herein are not limited to the specific architecture illustrated in FIG. 3, and that other architectures may be equally used without departing from the scope of the disclosed embodiments.

It should be further noted that the trust breaker 160 may be realized using a computing architecture similar to the architecture illustrated in FIG. 3, but that other architectures may be equally used without departing from the scope of the disclosed embodiments. Further, the memory 320 may include instructions for executing the function of the trust broker 160.

The various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for protecting entities against bots, comprising:
   identifying a request from a client to access a protected entity, wherein identifying the request from the client to access the protected entity further comprises obtaining staked access tokens deposited by the client;
   selecting an access policy in response to the access request, wherein the access policy includes at least one challenge to be performed by the client;
   converting the staked access tokens to a first type of access tokens thereby allowing the client to execute the at least one challenge based on having the first type of access tokens;
   identifying results of the at least one challenge, wherein the results are provided by the client upon completion of the challenge;
   determining a bias of the client based on the completion results, wherein the determined bias is utilized for a cyber-security assessment of the client; and
   granting access to the protected entity by the client based on the determined bias.

2. The method of claim 1, wherein the access policy is selected based on the protected entity.

3. The method of claim 2, wherein the access policy designates at least one of: the at least one challenge, the protected entity, a resource within the protected entity, and a scope of the at least one challenge.

4. The method of claim 1, wherein the access policy is further selected based on at least one selection parameter, wherein the at least one selection parameter includes any one of: reputation data and historical records.

5. The method of claim 1, wherein the at least one challenge is game programmed to at least establish the bias of the client.

6. The method of claim 1,
   wherein converting the staked access tokens to a first type of access tokens is based on a conversion value; and
   wherein the method further comprises:
   causing execution of the challenge when the client holds a sufficient amount of the first type of access tokens, wherein the staked access tokens and the first type of access tokens are cryptocurrency tokens having different cryptographic identities.

7. The method of claim 1, wherein the bias includes any one of: a cognitive bias, a behavioral bias, and an intent bias.

8. The method of claim 7, wherein each type of bias is defined to detect a cyber-security threat.

9. The method of claim 8, wherein the cyber-security threat is any one of: account takeover, denial of inventory, denial of service, and anti-scraping.

10. The method of claim 1, wherein granting the client an access the protected entity based on the determined bias further comprises:
  determining a drift from a previously established bias; and
  denying access to the protected entity when the drift from the previously established bias is determined.

11. A non-transitory computer readable medium having stored thereon instructions for causing a processing circuitry to execute a process, the process comprising:
  identifying a request from a client to access a protected entity, wherein identifying the request from the client to access the protected entity further comprises obtaining staked access tokens deposited by the client;
  selecting an access policy in response to the access request, wherein the access policy includes at least one challenge to be performed by the client;
  converting the staked access tokens to a first type of access tokens thereby allowing the client to execute the at least one challenge based on having the first type of access tokens;
  identifying results of the at least one challenge, wherein the results are provided by the client upon completion of the challenge;
  determining a bias of the client based on the completion results, wherein the determined bias is utilized for a cyber-security assessment of the client; and
  granting access to the protected entity by the client based on the determined bias.

12. A trust broker system for anti-bot protection, comprising:
  a processing circuitry; and
  a memory, the memory containing instructions that, when executed by the processing circuitry, configure the system to:
  identify a request from a client to access a protected entity, wherein identifying the request from the client to access the protected entity further comprises obtaining staked access tokens deposited by the client;
  select an access policy in response to the access request, wherein the access policy includes at least one challenge to be performed by the client;
  convert the staked access tokens to a first type of access tokens thereby allowing the client to execute the at least one challenge based on having the first type of access tokens;
  identify results of the at least one challenge, wherein the results are provided by the client upon completion of the challenge;
  determine a bias of the client based on the completion results, wherein the determined bias is utilized for a cyber-security assessment of the client; and
  grant access to the protected entity by the client based on the determined bias.

13. The system of claim 12, wherein the access policy is selected based on the protected entity.

14. The system of claim 13, wherein the access policy designates at least one of: the at least one challenge, the protected entity, a resource within the protected entity, and a scope of the at least one challenge.

15. The system of claim 13, wherein the access policy is further selected based on at least one selection parameter, wherein the at least one selection parameter includes any one of: reputation data and historical records.

16. The system of claim 15, wherein the at least one challenge is game programmed to at least establish the bias of the client.

17. The system of claim 12, wherein
  conversion of the staked access tokens to a first type of access tokens is based on a conversion value; and
  wherein the system is further configured to:
  cause execution of the challenge when the client holds a sufficient amount of the first type of access tokens, wherein the staked access tokens and the first type of access tokens are cryptocurrency tokens having different cryptographic identities.

18. The system of claim 12, wherein the bias includes any one of: a cognitive bias, a behavioral bias, and an intent bias.

19. The system of claim 18, wherein each type of bias is defined to detect a cyber-security threat.

20. The system of claim 19, wherein the cyber-security threat is any one of account takeover, denial of inventory, denial of service, and anti-scraping.

21. The system of claim 12, wherein the system is further configured to:
  determine a drift from a previously established bias; and
  deny access to the protected entity when the drift from the previously established bias is determined.

* * * * *